US009938483B2

(12) United States Patent
Sasaki et al.

(10) Patent No.: US 9,938,483 B2
(45) Date of Patent: Apr. 10, 2018

(54) COATING COMPOSITION FOR LUBRICATION FILM

(71) Applicant: Dow Corning Toray Co., Ltd., Tokyo (JP)

(72) Inventors: Takahiko Sasaki, Kanagawa (JP); Tetsuji Yamaguchi, Kanagawa (JP)

(73) Assignee: DOW CORNING TORAY CO., LTD., Tokyo (JP)

( * ) Notice: Subject to any disclaimer, the term of this patent is extended or adjusted under 35 U.S.C. 154(b) by 143 days.

(21) Appl. No.: 14/443,226

(22) PCT Filed: Nov. 20, 2013

(86) PCT No.: PCT/JP2013/081829
§ 371 (c)(1),
(2) Date: May 15, 2015

(87) PCT Pub. No.: WO2014/081044
PCT Pub. Date: May 30, 2014

(65) Prior Publication Data
US 2015/0307806 A1 Oct. 29, 2015

(30) Foreign Application Priority Data

Nov. 22, 2012 (JP) ................... 2012-256141

(51) Int. Cl.
| | |
|---|---|
| C10M 169/04 | (2006.01) |
| C09D 175/14 | (2006.01) |
| C09D 175/16 | (2006.01) |
| C08L 83/04 | (2006.01) |
| C09D 183/04 | (2006.01) |
| C08G 18/67 | (2006.01) |
| C08G 18/42 | (2006.01) |
| C08G 18/44 | (2006.01) |
| B60J 10/17 | (2016.01) |

(52) U.S. Cl.
CPC .......... *C10M 169/041* (2013.01); *B60J 10/17* (2016.02); *C08G 18/42* (2013.01); *C08G 18/44* (2013.01); *C08G 18/672* (2013.01); *C08L 83/04* (2013.01); *C09D 175/14* (2013.01); *C09D 175/16* (2013.01); *C09D 183/04* (2013.01); *C10M 169/04* (2013.01); *C08L 2205/03* (2013.01)

(58) Field of Classification Search
CPC ..... C09D 175/14; C09D 175/16; C08L 83/04; C08L 83/00
See application file for complete search history.

(56) References Cited

U.S. PATENT DOCUMENTS

| | | | | |
|---|---|---|---|---|
| 4,635,947 A | * | 1/1987 | Hatayama ................ | B60J 10/17 277/345 |
| 6,482,872 B2 | | 11/2002 | Downie | |
| 7,439,279 B2 | | 10/2008 | Kondo et al. | |
| 2005/0085586 A1 | * | 4/2005 | Sydes ...................... | B60J 10/17 524/589 |
| 2012/0149611 A1 | | 6/2012 | Yamaguchi et al. | |

FOREIGN PATENT DOCUMENTS

| | | | |
|---|---|---|---|
| JP | H11-268196 A | | 10/1999 |
| JP | 2000-313234 A | | 11/2000 |
| JP | 2000313234 A | * | 11/2000 |
| JP | 2004-176054 A | | 6/2004 |
| JP | 2005513209 A | | 5/2005 |
| JP | 4042192 B2 | * | 2/2008 |
| JP | 2011026606 A | | 2/2011 |
| WO | WO03/053728 A1 | | 7/2003 |

OTHER PUBLICATIONS

PCT/JP2013/081829 International Search Report dated Oct. 9, 2014, 3 pages.
English language abstract and machine translation for JPH11268196 (A) extracted from https://www4.j-platpat.inpit.go.jp/eng/tokujitsu/tkbs_en/TKBS_EN_GM301_Detailed.action database on May 13, 2015, 30 pages.
English language abstract for JP200313234 (A) extracted from https://www4.j-platpat.inpit.go.jp/eng/tokujitsu/tkbs_en/TKBS_EN_GM401_Detailed.action# database on May 13, 2015, 6 pages.
English language abstract for JP2004176054 (A) extracted from http://worldwide.espacenet.com/ database on May 5, 2015,1 page.
English language abstract for JP2005513209 (A) extracted from http://worldwide.espacenet.com/ database on May 5, 2015,1 page.
English language abstract for JP2011026606 (A) extracted from http://worldwide.espacenet.com/ database on May 5, 2015,1 page.

* cited by examiner

*Primary Examiner* — Taiwo Oladapo
(74) *Attorney, Agent, or Firm* — Warner Norcross & Judd LLP

(57) ABSTRACT

A coating composition for lubrication film is disclosed. The coating composition comprises (A) a high energy beam-curable resin, (B) silicone elastomer fine particles, and (C) a gum-like polysiloxane. The coating composition is capable of forming a lubrication film that suppresses the occurrence of stick-slip phenomenon, has good feel, adheres to a substrate, and has excellent followability (i.e. ability to follow the elastic transformation) to conform to deformation of the substrate.

16 Claims, No Drawings

COATING COMPOSITION FOR LUBRICATION FILM

CROSS-REFERENCE TO RELATED APPLICATIONS

This application is the National Stage of International Patent Application No. PCT/JP2013/081829, filed on Nov. 20, 2013, which claims priority to and all advantages of Japanese Patent Application No. 2012-256141, filed on Nov. 22, 2012, the content of which is hereby incorporated by reference.

TECHNICAL FIELD

The present invention relates to a coating composition for lubrication film. In particular, the present invention relates to a coating composition for lubrication film that is curable by high energy beam irradiation and contains silicone elastomer fine particles and gum-like polysiloxane.

BACKGROUND ART

The formation of a lubrication film on the surface of various types of substrates by coating the surface of the substrate with a resin capable of being cured by high energy beams such as ultraviolet radiation or the like, and irradiating the coated substrate with the high energy beams, is known. Various proposals have been made previously for coating compositions for lubrication film to form a lubrication film in this manner.

A composition for forming a lubrication film including a UV curable resin is proposed in Patent Document 1. Finely powdered polytetrafluoroethylene is further blended in this composition as a friction reducing agent. According to this composition, a finely powdered polytetrafluoroethylene (i.e. fluoro resin fine particles) is included in this composition, and thus it is possible to maintain good sliding characteristics over a long time interval, and it is possible to lower the coefficient of friction during sliding.

Patent Documents 2 and 3 disclose high energy beam-curable coating compositions that include 100 parts by mass of a high energy beam-curable polymerizable monomer (A), 0.01 to 10 parts by mass of a lubricating agent (B), and 0.1 to 10 parts by mass of a high energy beam polymerization initiator (C). By using this composition, these documents teach that it is possible to form a coating that has excellent wear resistance, surface lubrication, and excellent transparency over a long time interval.

Patent Document 4 discloses a coating composition for a film formed by blending 10 to 100 parts by weight of a silicone rubber spherical fine powder (average particle diameter of 1 to 20 μm, JIS A hardness of 60 to 80) per 100 parts by weight of a curable silicone polymer. According to this composition, a film can be formed that has good visual appearance (i.e. mat), and has excellent lubrication ability, wear resistance, and coating surface scratch resistance.

PRIOR ART DOCUMENTS

Patent Documents

Patent Document 1: Japanese Unexamined Patent Application Publication No. 2005-513209A (Translation of PCT publication WO03053728)
Patent Document 2: Japanese Unexamined Patent Application Publication No. 2004-176054A
Patent Document 3: Japanese Unexamined Patent Application Publication No. 2011-026606A
Patent Document 4: Japanese Unexamined Patent Application Publication No. 2000-313234A

SUMMARY OF INVENTION

Technical Problem

However, the blended amount of solid lubricant in the composition disclosed in Patent Document 1 is low, and thus there has been a problem of an inability to suppress the stick-slip phenomenon caused by differences between the dynamic coefficient of friction and static coefficient of friction. Moreover, if the blended amount of this solid lubricant is increased, there have been problems including an inability for high energy beam to reach the interior of the film, and an inability to obtain a sufficiently cured film. Moreover, the compositions disclosed in Patent Documents 2 and 3 have had a problem in that it is difficult for the formed cured film to conform to the deformation of the substrate. Moreover, the composition disclosed in Patent Document 4 must be heated in order to obtain a cured film, and thus there has been a problem of the inability to use such a composition on a substrate having low durability at high temperature, i.e. thermoplastic resins or the like.

The present invention was conceived in consideration of such circumstances of the conventional technology. An object of the present invention is to provide a coating composition for lubrication film that can form a film that suppresses the occurrence of the stick-slip phenomenon, that has good feel when contacted by the fingers or the like, that has good adhesion to substrates, and that has excellent lubrication performance even when conforming to deformation of a deformed substrate. Moreover, further objects for the present invention are to provide a lubrication film having such excellent characteristics and a method of forming such a lubrication film.

Solution To Problem

In order to solve the problem, the coating composition for lubrication film of the present invention comprises: (A) a high energy beam-curable resin, (B) silicone elastomer fine particles; and (C) a gum-like polysiloxane.

In the coating composition for lubrication film of the present invention, the high energy beam-curable resin preferably is a radical-polymerizable high energy beam-curable resin, and the coating composition for lubrication film preferably further comprises (D) a radical type photoinitiator.

In the coating composition for lubrication film of the present invention, a weight average molecular weight of the gum-like polysiloxane (C) is preferably from 100,000 to 1,500,000. The coating composition for lubrication film of the present invention preferably comprises from 1 to 40 parts by weight of the gum-like polysiloxane (C) per 100 parts by weight of the high energy beam-curable resin (A).

In the coating composition for lubrication film of the present invention, the high energy beam-curable resin (A) is preferably a (meth)acryloyl group-containing compound having a urethane bond.

In the coating composition for lubrication film of the present invention, an average particle diameter of the silicone elastomer fine particles (B) is preferably from 0.1 μm to 50 μm.

The coating composition for lubrication film of the present invention preferably further comprises from 1 to 150 parts by weight of the silicone elastomer fine particles (B) per 100 parts by weight of the high energy beam-curable resin (A).

The coating composition for lubrication film of the present invention preferably further comprises at least one type of (E) solid lubricant.

Hence the composition may comprise
a high energy beam-curable resin (A);
from 1 to 150 parts by weight per 100 parts by weight of the high energy beam-curable resin (A) of silicone elastomer fine particles (B) preferably having an average particle diameter of from 0.1 μm to 50 μm;
1 to 40 parts by weight per 100 parts by weight of the high energy beam-curable resin (A) of a gum-like polysiloxane (C) preferably having a weight average molecular weight of from 100,000 to 1,500,000; and optionally
a radical type photoinitiator (D), a solid lubricant (E) or a combination of thereof.

The present invention also relates to a lubrication film cured by irradiating the coating composition for lubrication film with high energy beams.

The present invention also relates to a method of forming a lubrication film comprising the steps of: applying the coating composition for lubrication film to a surface of a substrate; and curing the coating composition for lubrication film by irradiating the coating composition for lubrication film applied to the surface of the substrate with high energy beams.

Advantageous Effects of Invention

The coating composition for lubrication film of the present invention is able to form a lubrication film that has a small (i.e. <0.10) difference between the static coefficient of friction and dynamic coefficient of friction without blending a large amount of solid lubricant. Thus the coating composition for lubrication film of the present invention is able to form a lubrication film that has good moist feel and lacks a feel of friction when touched by the fingers and that can suppress the occurrence of the stick-slip phenomenon.

Moreover, the coating composition for lubrication film of the present invention does not contain a large amount of solid lubricant. Thus curability of the lubrication film is not impaired upon irradiation using high energy beams.

Moreover, the coating composition for lubrication film of the present invention has good adhesion to the substrate and is capable of forming a lubrication film on the substrate that has excellent followability (i.e. ability to follow the elastic transformation) to conform to the substrate even when the substrate is deformed. Moreover, heating is unnecessary for curing the coating composition for lubrication film, and thus it is possible to form a lubrication film on the surface of a substrate of the desired substance.

Since the difference between the static coefficient of friction and dynamic coefficient of friction is small (i.e. <0.10) for the lubrication film of the present invention, it is possible to suppress the occurrence of the stick-slip phenomenon, the lubrication film has good moist feel and lacks a feel of friction when touched by the fingers, adhesion to the substrate is good, and the lubrication film can display good followability to conform to deformation of the substrate.

The method of forming the lubrication film of the present invention is capable of forming a lubrication film that has a small (i.e. <0.10) difference between the static coefficient of friction and dynamic coefficient of friction, and thus this method is capable of forming a lubrication film capable of suppressing the stick-slip phenomenon. Moreover, it is possible to form on the substrate a film that displays good moist feel and lacks a feel of friction when touched by the fingers, that displays good adhesion to the substrate, and that displays good followability to conform to deformation of the substrate. Furthermore, heating is unnecessary for curing the coating composition for lubrication film, and thus it is possible to form a lubrication film on the surface of a substrate of the desired substance.

DETAILED DESCRIPTION OF THE INVENTION

Although embodiments of the present invention are described below in detail, the present invention is not limited by the below described embodiments, and various types of modifications are possible within the scope of the gist of the present invention.

<Coating Composition for Lubrication Film>

The coating composition for lubrication film of the present invention is characterized as being composed of at least (A) a high energy beam-curable resin, (B) silicone elastomer fine particles, and (C) a gum-like polysiloxane. By use of this type of coating composition for lubrication film, it is possible to form a lubrication film that has a small (i.e. <0.10) difference between the static coefficient of friction and dynamic coefficient of friction. Thus it is possible to suppress the occurrence of the stick-slip phenomenon, and to form a lubrication film that has good moist feel and lacks a feel of friction when touched by the fingers. Moreover, there is good adhesion to the substrate, and even when the substrate is deformed, it is possible to form on the substrate a lubrication film that has excellent conformance to such deformation. Due to the lack of need for heating to cure the coating composition for lubrication film, it is possible to form the lubrication film of the surface of a substrate of the desired substance. Furthermore, a large amount of solid lubricant is not included in the coating composition for lubrication film, and thus the curability of the lubrication film during high energy beam irradiation is excellent. Each of the components will be described below in detail.

No particular limitation is placed on the high energy beam-curable resin (A) as long as the resin is curable by polymerization due to irradiation by high energy beams. Among such resins, the high energy beam-curable resin (A) is preferably a radical-polymerizable resin due to the ability to cure in a short time interval and the ability, due to low generation of heat during curing, to suppress the effect on the substrate of heat during curing. The high energy beam-curable resin (A) is exemplified by acrylic resins having acrylate groups or methacrylate groups, urethane resins, olefin resins, epoxy resins, polyamide imide resins, modified products of such resins, or the like, and mixtures of such resins. Furthermore, the expression "high energy beam" in the present specification means electromagnetic and particle radiation such as infrared radiation, visible radiation, ultraviolet radiation, X-rays, electron beam, radioactive radiation, or the like. The high energy beam is preferably ultraviolet radiation having a wavelength of from 180 to 500 nm, and further preferably a wavelength of from 200 to 450 nm.

The high energy beam-curable resin (A) is preferably a resin composition including at least one type of compound for initiating a polymerization reaction by irradiation by high energy beams. The compound that initiates the polymerization reaction due to irradiation by the high energy beams is preferably a multi-functional compound that has, in a molecule, at least two polymerizable functional groups capable of polymerization due to high energy beams. Examples of the polymerizable functional groups include acryloyl groups, methacryloyl groups, vinyl groups, allyl groups, and similar groups having carbon-carbon double bonds. Of these, acryloyl groups or methacryloyl groups are preferable and, from the point of polymerizability, acryloyl groups are more preferable. Note that the polyfunctional compound may have a total of two or more of two or more types of polymerizable functional groups in each molecule. A range of the number of polymerizable functional groups in each molecule of the polyfunctional compound is not particularly limited but, normally, from 2 to 50 groups is suitable, but from 2 to 30 groups is preferable.

In a preferred aspect of the present invention, the high energy beam-curable resin (A) includes at least a polyfunctional compound (referred to hereinafter as the "polyfunctional compound (a-1)") having at least two of at least one type of polymerizable functional groups selected from an acryloyl group and a methacryloyl group. Furthermore, in the below description, the acryloyl group and methacryloyl group are collectively termed the "(meth)acryloyl group", acrylic acid and methacrylic acid are collectively termed as "(meth)acrylic acid", and acrylate and methacrylate are collectively termed as "(meth)acrylate".

The polyfunctional compound (a-1) may have various types of functional groups or bonds in addition to the polymerizable functional group. Such additional functional groups and bonds may be selected as one type or two or more types selected from the group consisting of a hydroxyl group, carboxyl group, halogen atoms, epoxy group, urethane bond, ether bond, ester bond, carbonate bond, thioether bond, amide bond, imide bond, and the like. Among such functional groups and bonds, compounds including the (meth)acryloyl group-containing compounds having a urethane bond (referred to hereinafter as "urethane acrylate"), and (meth)acrylic ester compounds free of urethane bonds, are preferred as the polyfunctional compound (a-1) from the standpoint of film curability. Urethane acrylates are particularly preferred from the standpoints of film curability, wear resistance, adhesion to the substrate, and followability to conform to deformation of the substrate. These two polyfunctional compounds will be described hereinafter.

Urethane acrylates are exemplified by:

(1) the reaction product between a compound (a1) having a (meth)acryloyl group and hydroxyl group and a compound having at least two isocyanate groups (referred to hereinafter as the "polyisocyanate");

(2) the reaction product between the compound (a1), a compound (a2) having two or more hydroxyl groups, and a polyisocyanate; and (3) the reaction product between a compound (a3) having a (meth)acryloyl group and an isocyanate group and the compound (a2).

These reaction products are preferably free of isocyanate groups, but may include hydroxyl groups. Thus, in the production of these reaction products, a total number of moles of the hydroxyl groups of the total reactant is preferably greater than or equal to a total number of moles of the isocyanate groups.

The compound (a1) having the (meth)acryloyl groups and the hydroxyl groups may be a compound having one each of the (meth)acryloyl groups and the hydroxyl groups. The compound (a1) may alternately be a compound having two or more of the (meth)acryloyl groups and one of the hydroxyl groups, a compound having one of the (meth) acryloyl groups and two or more of the hydroxyl groups, or a compound having two or more of each of the (meth) acryloyl groups and the hydroxyl groups.

Specific examples thereof include, in the order described above, 2-hydroxyethyl(meth)acrylate, trimethylolpropane di(meth)acrylate, trimethylolpropane mono(meth)acrylate, pentaerythritol di(meth)acrylate, a reaction product of 2-hydroxyethyl (meth)acrylate and neopentylglycol carbonate, and the like. These are monoesters of a compound having two or more hydroxyl groups and a (meth)acrylate, or polyesters having one or more hydroxyl group remaining.

Furthermore, the compound (a1) may be a ring-opening reaction product of a compound having one or more epoxy group and (meth)acrylate. Ester bonds and hydroxyl groups are generated via the opening of the epoxy groups through the reaction of the epoxy groups with the (meth)acrylate, and result in a compound having (meth)acryloyl groups and hydroxyl groups. Additionally, a hydroxyl group-containing compound can be obtained by opening the epoxy groups of the compound having one or more epoxy group, and this compound can be converted into a (meth)acrylic ester.

The compound having one or more epoxy group is preferably the polyepoxide known as epoxy resin. Preferable examples of the polyepoxide include a compound having two or more glycidyl groups such as a polyhydric phenol-polyglycidylether (e.g. a bisphenol A-diglycidylether), and an alicyclic epoxy compound. Furthermore, a reaction product of a (meth)acrylate having epoxy groups and a compound having hydroxyl groups and carboxyl groups can be used as the compound (a1). Examples of the (meth)acrylate having epoxy groups include glycidyl (meth)acrylate.

Specific examples of the compound (a1) other than those described above include 2-hydroxypropyl (meth)acrylate, 1,3-propanediol mono(meth)acrylate, 1,4-butanediol mono (meth)acrylate, 2-butene-1,4-diol mono(meth)acrylate, 1,6-hexanediol mono(meth)acrylate, glycidol di(meth)acrylate, pentaerythritol tri(meth)acrylate, dipentaerythritol mono(to penta)(meth)acrylate, polyethylene glycol mono(meth)acrylate, polypropylene glycol mono(meth)acrylate, a reaction product of bisphenol A-diglycidylether and (meth)acrylic acid, and the like.

The polyisocyanate may, of course, be an ordinary monomeric polyisocyanate, but may also be a polyisocyanate multimer or variant, or a prepolymeric compound such as an isocyanate group-containing urethane prepolymer, or the like.

Examples of the multimer include trimers (isocyanurate variant), dimers, carbodiimide variants, and the like. Examples of the variants include urethane variants, biuret variants, allophanate variants, urea variants, and the like that are obtained by modifying using trimethylolpropane and other polyhydric alcohols. Examples of prepolymeric compounds include isocyanate group-containing urethane prepolymers and the like obtained by reacting a polyether polyol, a polyester polyol, or a similar polyol with a polyisocyanate. Such polyisocyanates may be used as a single type or in combination as two or more types.

Specific examples of the monomeric polyisocyanate include 2,6-tolylene diisocyanate, 2,4-tolylene diisocyanate, methylene bis(4-phenyl isocyanate) [MDI], 1,5-naphthalene diisocyanate, tolidine diisocyanate, hexamethylene diisocyanate, isophorone diisocyanate, p-phenylene diisocyanate, transcyclohexane-1,4-diisocyanate, xylylene diisocyanate [XDI], hydrogenated XDI, hydrogenated MDI, lysine diisocyanate, tetramethyixylene diisocyanate, trimethylhexamethylene diisocyanate, lysine ester triisocyanate, 1,6,11-undecane triisocyanate, 1,8-diisocyanate-4-isocyanate methyloctane, 1,3,6-hexamethylene triisocyanate, bicycloheptane triisocyanate, and the like (abbreviations are included in brackets).

Non-yellowing polyisocyanate (polyisocyanate free of isocyanate groups directly bonded to aromatic nuclei) is particularly preferable as the polyisocyanate. Specific examples thereof include hexamethylene diisocyanate and similar aliphatic polyisocyanates, isophorone diisocyanate and similar alicyclic polyisocyanates, and xylylene diisocyanate and similar aromatic polyisocyanates. As described above, multimers and variants of the polyisocyanate are also preferable.

Examples of the compound (a2) having two or more hydroxyl groups include polyhydric alcohols, polyols with a higher molecular weight compared to polyhydric alcohols, and the like. The polyhydric alcohol is preferably a polyhydric alcohol having from 2 to 8 hydroxyl groups, and is more preferably a polyhydric alcohol having from 2 to 6 hydroxyl groups. The polyhydric alcohol may, of course, be an aliphatic polyhydric alcohol, and may also be a polyhydric alcohol having an alicyclic polyhydric alcohol and an aromatic nucleus.

Examples of the polyhydric alcohol having an aromatic nucleus include alkylene oxide adducts of polyhydric phenols, ring-opened products of polyepoxides having an aromatic nucleus such as polyhydric phenol-polyglycidylether or the like, and the like. Examples of the polyol having a high molecular weight include polyether polyols, polyester polyols, polyetherester polyols, polycarbonate polyols, and the like. Additionally, a hydroxyl group-containing vinyl polymer can also be used as the polyol. Such polyhydric alcohols and polyols may be used as one type or in combination as two or more types.

Specific examples of the polyhydric alcohol include ethylene glycol, 1,2-propylene glycol, 1,3-propanediol, 1,3-butanediol, 1,4-butanediol, 1,6-hexanediol, diethyleneglycol, dipropylene glycol, neopentyl glycol, 2,2,4-trimethyl-1,3-pentanediol, cyclohexanediol, dimethylol cyclohexane, trimethylolpropane, glycerin, tris(hydroxyalkyl)isocyanurate, pentaerythritol, ditrimethylolpropane, dipentaerythritol, 3,9-bis(hydroxymethyl)-2,4,8,10-tetraoxaspiro[5.5]undecane, 3,9-bis(2-hydroxy-1,1-dimethylethyl)-2,4,8,10-tetraoxaspiro[5.5]undecane, ring-opened products of bisphenol A-diglycidylether, ring-opened products of vinylcyclohexene dioxide, and the like.

Specific examples of the polyol include polyether polyols such as polyethylene glycol, polypropylene glycol, bisphenol A-alkylene oxide adducts, polytetramethylene glycol, or the like; aliphatic polyols such as polybutadiene diol, hydrogenated polybutadiene diol, or the like; poly-ε-caprolactone polyol; polyester polyols obtained by reaction between polybasic acids such as adipic acid, sebacic acid, phthalic acid, maleic acid, fumaric acid, azelaic acid, glutaric acid, or the like and the polyhydric alcohols; polycarbonate diols obtained by reaction between diols such as 1,6-hexanediol and the like and an ester carbonate and phosgene; or the like.

Examples of the hydroxyl group-containing vinyl polymer include copolymers of allyl alcohol, vinyl alcohol, hydroxy alkyl vinyl ether, hydroxyalkyl (meth)acrylate, or a similar hydroxyl group-containing monomer and olefin or a similar hydroxyl group-free monomer, and the like.

Examples of the compound (a3) having the (meth)acryloyl groups and the isocyanate groups include 2-isocyanatoethyl (meth)acrylate, methacryloyl isocyanate, and the like.

From the standpoint of film curability, wear resistance, adhesion to the substrate, and followability to conform to deformation of the substrate, preferred urethane acrylates are exemplified by urethane acrylates (referred to hereinafter as "pentaerythritol-based urethane acrylates") obtained by using a polyester having one or more hydroxyl groups of pentaerythritol or polypentaerythritol and (meth)acrylic acid remaining (hereinafter referred to as "hydroxyl group-containing pentaerythritol-based (meth)acrylate"). Of these, reaction products of the hydroxyl group-containing pentaerythritol-based (meth)acrylate and the polyisocyanate; reaction products obtained by reacting the polyisocyanate with a mixture of the hydroxyl group-containing pentaerythritol-based (meth)acrylate and the compound (a2) having two or more other hydroxyl groups at a relatively lower amount, or the like; and the like are particularly preferable.

The polypentaerythritol may be a mixture of polypentaerythritols having different degrees of polymerization, and may include pentaerythritol. Likewise, the hydroxyl group-containing pentaerythritol-based (meth)acrylate may be a mixture of two or more types of compounds such as a mixture of two or more types of compounds derived from the polypentaerythritol described above, and a mixture of two or more types of differing compounds having hydroxyl groups and (meth)acryloyloxy groups in each molecule. The pentaerythritol-based urethane acrylate may be a similar mixture.

The preferred urethane acrylate is exemplified by polyester type polyurethanes obtained using polyester polyol. Moreover, from the standpoints of wear resistance, followability to conform to the substrate, and low temperature characteristics, the preferred urethane acrylate is exemplified by a reaction product between a compound (a1) having a (meth)acryloyl group and hydroxyl group, polyester polyol, and polyisocyanate; a reaction product between polyisocyanate and a mixture of a compound (a1) having a (meth)acryloyl group and hydroxyl group, polyester polyol, and a relatively small amount (relative to the polyester polyol) of a compound (a2) having two or more hydroxyl groups, or the like; and the like.

Additionally, polycarbonate-based polyurethanes obtained by using polycarbonate diol are also preferable. From the standpoints of wear resistance, hydrolysis resistance, heat resistance, and weathering resistance, preferred polycarbonate-based polyurethanes include the reaction product between polyisocyanate and the compound (a1) having a (meth)acryloyl group and hydroxyl group and a polycarbonate diol; the reaction product between polyisocyanate and a mixture of a compound (a1) having a (meth) acryloyl group and hydroxyl group, polycarbonate diol, and a relatively small amount (relative to the polycarbonate diol) of a compound (a2) having two or more hydroxyl groups, or the like; and the like.

A polyester of a compound like the compound (a2) having two or more hydroxyl groups and (meth)acrylic acid is preferable as the (meth)acrylic ester compound free of urethane bonds. The polyhydric alcohol and polyol described above is preferable as the compound having two or more hydroxyl groups. Furthermore, a (meth)acrylic ester compound, which is a reaction product of a compound having two or more epoxy groups and (meth)acrylic acid is also preferable.

A polyepoxide may be used as the compound having two or more epoxy groups. For example, commercially available products can be used as glycidyl ether polyepoxide, alicyclic polyepoxide, and similar epoxy resins.

Specific examples of the polyepoxide include bisphenol A-diglycidylether, bisphenol F-diglycidylether, tetrabromobisphenol A-diglycidylether, glycerin triglycidylether, novolac polyglycidylether, vinylcyclohexene dioxide, dicyclopentadiene dioxide, and the like.

Specific examples of the (meth)acrylic ester compound free of urethane bonds include the compounds described below.

1,4-butanediol di(meth)acrylate, neopentyl glycol di(meth)acrylate, 1,6-hexanediol di(meth)acrylate, a di(meth) acrylate of long chain aliphatic diol having from 14 to 15 carbons, 1,3-butanediol di(meth)acrylate, ethylene glycol di(meth)acrylate, diethylene glycol di(meth)acrylate, glycerol tri(meth)acrylate, glycerol di(meth)acrylate, triglycerol di(meth)acrylate, trimethylolpropane tri(meth)acrylate, ditrimethylolpropane tetra(meth)acrylate, pentaerythritol tri (meth)acrylate, pentaerythritol tetra(meth)acrylate, dipenta erythritol hexa(meth)acrylate, dipenta erythritol penta(meth) acrylate, a di(meth)acrylate of a diol formed from a condensate of neopentyl glycol and trimethylolpropane, and similar (meth)acrylates of aliphatic polyhydric alcohol.

Di(2-(meth)acryloyloxyethyl)bisphenol A, di(2-(meth) acryloyloxyethyl)bisphenol S, di(2-(meth)acryloyloxyethyl) bisphenol F, tris(2-(meth)acryloyloxyethyl)isocyanurate, bis (2-(meth)acryloyloxyethyl)-(2-hydroxyethyl)isocyanurate, bisphenol A dimethacrylate, and similar (meth)acrylates of polyhydric alcohols or polyhydric phenols having an aromatic nucleus or a triazine ring.

A tri(meth)acrylate of a trimethylolpropane-ethylene oxide adduct, a tri(meth)acrylate of a trimethylolpropane-propylene oxide adduct, triethylene glycol di(meth)acrylate, tetraethylene glycol di(meth)acrylate, tripropylene glycol di(meth)acrylate, a hexa(meth)acrylate of a dipenta erythritol-caprolactone adduct, a tri(meth)acrylate of a tris(2-hydroxyethyl)isocyanurate-caprolactone adduct, polyethyleneglycol [200 to 1,000] di(meth)acrylate, polypropyleneglycol [200 to 1,000] di(meth)acrylate, and similar (meth) acrylates of hydroxyl group-containing compound-alkylene oxide adducts, (meth)acrylates of hydroxyl group-containing compound-caprolactone adducts, and (meth)acrylates of polyoxyalkylene polyols (ranges in the square brackets indicate the molecular weight of the polyoxyalkylene polyol as measured by gel permeation chromatography (GPC), in terms of weight average molecular weight of standard polystyrene).

Bis(acryloyloxy neopentyl glycol)adipate, a di(meth) acrylate of a neopentylglycol hydroxypivalate ester, a di(meth)acrylate of a neopentylglycol hydroxypivalate ester-caprolactone adduct, bis(2-(meth)acryloyloxyethyl) phosphate, tris(2-(meta)acryloyloxyethyl)phosphate, and similar carboxylate esters and phosphate esters having (meth)acryloyl groups.

A (meth)acrylic acid adduct of a bisphenol A-diglycidylether, vinylcyclohexene dioxide-(meth)acrylic acid adduct, dicyclopentadiene dioxide-(meth)acrylic acid adduct, a reaction product of glycidyl (meth)acrylate and ethylene glycol, a reaction product of glycidyl (meth)acrylate and propylene glycol, a reaction product of glycidyl (meth) acrylate and diethyleneglycol, a reaction product of glycidyl (meth)acrylate and 1,6-hexanediol, a reaction product of glycidyl (meth)acrylate and glycerol, a reaction product of glycidyl (meth)acrylate and trimethylolpropane, a reaction product of glycidyl (meth)acrylate and phthalic acid, and similar (meth)acrylic acid adducts of polyepoxides (however, one molecule of (meth)acrylic acid is added per one epoxy group of the polyepoxide), and a reaction product of glycidyl (meth)acrylate and polyhydric alcohol or polyhydric carboxylic acid (however, two or more molecules of the glycidyl (meth)acrylate are reacted per one molecule of the polyhydric alcohol).

Alkyl-modified dipentaerythritol penta(meth)acrylate, alkyl-modified dipentaerythritol tetra(meth)acrylate, alkyl-modified dipenta erythritol tri(meth)acrylate, an allyl-etherified product of a vinylcyclohexene dioxide-(meth)acrylic acid adduct, a methyl-etherified product of a vinylcyclohexene dioxide-(meth)acrylic acid adduct, a stearic acid-modified pentaerythritol di(meth)acrylate, or a similar carboxylic acid-esterified product, alkenyl-etherified product, or alkyl-etherified product that is a (meth)acrylate and that is a compound having unreacted hydroxyl groups, like those described above.

A particularly preferable (meth)acrylic ester compound free of urethane bonds is a poly(meth)acrylate of an isocyanurate-based polyol (hereinafter referred to as "isocyanurate-based (meth)acrylate"). The isocyanurate-based polyol is an isocyanuric acid ester having two or more hydroxyl groups such as tris(hydroxyalkyl)isocyanurate or the like. In the isocyanurate-based polyol, the three organic groups bonded, respectively, to the three nitrogen atoms of the isocyanurate ring may be the same or different. Each of at least two of the three organic groups preferably has at least one hydroxyl group and, more preferably, each of the three organic groups has one hydroxyl group.

Other than tris(hydroxyalkyl)isocyanurate, a tris(hydroxyalkyl)isocyanurate-alkylene oxide adduct and a tris (hydroxyalkyl)isocyanurate-lactone adduct are preferable as the isocyanurate-based polyol. An added amount of alkylene oxide or lactone in these adducts is preferably from 1 to 12 molecules and more preferably from 1 to 6 molecules per one molecule of the tris(hydroxyalkyl)isocyanurate. A hydroxyalkyl group having from 2 to 6 carbons and more preferably from 2 to 4 carbons is preferable as the hydroxyalkyl group in the tris(hydroxyalkyl)isocyanurate. Specific examples thereof include a 2-hydroxyethyl group, a 2-hydroxypropyl group, a 4-hydroxybutyl group, and the like. Preferable examples thereof are the 2-hydroxyethyl group and the 2-hydroxypropyl group. Note that combinations of two or more types of these isocyanurate-based polyols can be used.

Ethylene oxide, propylene oxide, 1,2-butene oxide, 2,3-butene oxide, and the like are preferable as the alkylene oxide, of which ethylene oxide and propylene oxide are more preferable. Other than ε-caprolactone, butyrolactone, γ-valerolactone, γ-caprolactone, δ-caprolactone, and the like are preferable as the lactone, of which ε-caprolactone is particularly preferable.

An appropriate number of (meth)acryloyloxy groups per one molecule of the isocyanurate-based (meth)acrylate is from 2 to 3, and these may be a mixture. Preferably, the isocyanurate-based (meth)acrylate has three (meth)acryloyloxy groups. Preferable examples of the isocyanurate-based (meth)acrylate include those compounds described above, as well as tris(2-(meth)acryloyloxyethyl)isocyanurate, bis(2-(meth)acryloyloxyethyl)-(2-hydroxyethyl)isocyanurate, a tri (meth)acrylate or di(meth)acrylate of a triol formed from a ε-caprolactone 1 to 3 molecular adduct of tris(2-hydroxyethyl)isocyanurate, a tri(meth)acrylate or di(meth)acrylate of a triol formed from an ethylene oxide 1 to 3 molecular adduct of tris(2-hydroxyethyl)isocyanurate, and the like.

The pentaerythritol-based urethane acrylates and the isocyanurate-based (meth)acrylates are particularly preferred as the polyfunctional compound (a-1). These may also be preferably used in combination. A ratio that these account for in the entire polyfunctional compound (a-1) is preferably not less than 20% by weight, and more preferably not less than 40% by weight.

The high energy beam-curable resin (A) may include another polymerizable compound such as a monofunctional compound (referred to hereinafter as the "monofunctional compound (a-2))", or the like.

A monofunctional polymerizable compound having one (meth)acryloyl group in each molecule is preferable as the monofunctional compound (a-2). The monofunctional compound (a-2) is exemplified by: alkyl (meth)acrylates indicated by the general formula $CH_2=C(R^1)COOC_zH_{2z+1}$ (in the formula, $R^1$ is a hydrogen atom or methyl group; z is an integer ranging from 1 to 13; and $C_zH_{2z+1}$ may have a linear or branched structure), allyl (meth)acrylate, benzyl (meth)acrylate, butoxyethyl (meth)acrylate, butanediol (meth)acrylate, butoxytriethylene glycol mono(meth)acrylate, tert-butylaminoethyl (meth)acrylate, 3-chloro-2-hydroxypropyl (meth)acrylate, 2-cyanoethyl (meth)acrylate, cyclohexyl (meth)acrylate, 2,3-dibromopropyl (meth)acrylate, dicyclopentenyl (meth)acrylate, N,N-diethylaminoethyl (meth)acrylate, N,N-dimethylaminoethyl (meth)acrylate, 2-ethoxyethyl (meth)acrylate, 2-(2-ethoxyethoxy)ethyl (meth)acrylate, 2-ethylhexyl (meth)acrylate, glycerol (meth)acrylate, glycidyl (meth)acrylate, heptadecafluorodecyl (meth)acrylate; 2-hydroxyethyl (meth)acrylate, 2-hydroxy-3-(meth)acryloyloxypropyl trimethylammonium chloride, 2-hydroxypropyl (meth)acrylate, γ-(meth)acryloxypropyltrimethoxysilane, 2-methoxyethyl (meth)acrylate, methoxydiethylene glycol (meth)acrylate, methoxyethylene glycol (meth)acrylate, methoxytetraethylene glycol (meth)acrylate, methoxydipropylene glycol(meth)acrylate, methoxylated cyclodecatriene (meth)acrylate, morpholine (meth)acrylate, nonylphenoxypolyethylene glycol (meth)acrylate, nonylphenoxypolypropylene glycol (meth)acrylate, octafluoropentyl (meth)acrylate, phenoxyhydroxypropyl (meth)acrylate, phenoxyethyl (meth)acrylate, phenoxydiethylene glycol (meth)acrylate, phenoxytetraethylene glycol(meth)acrylate, phenoxyhexaethylene glycol (meth)acrylate, phenoxy (meth)acrylate, polypropylene glycol(meth)acrylate, sodium 2-sulfonate ethoxy(meth)acrylate, tetrafluoropropyl (meth)acrylate, tetrahydrofurfuryl (meth)acrylate, trifluoroethyl (meth)acrylate, vinyl acetate, N-vinyl caprolactam, N-vinyl pyrrolidone, dicyclopentadienyl (meth)acrylate, isobornyl acrylate, or the like.

In the total, weight basis content of the polymerizable compounds included in the high energy beam-curable resin (A), the content of the polyfunctional compound (a-1) is preferably from 20 to 100% by weight, further preferably is from 50 to 100% by weight, and most preferably is from 70 to 100% by weight. Among the polymerizable monomers included in the high energy beam-curable resin (A), when the proportion of the polyfunctional compound (a-1) is within this range, the lubrication film composed of the cured product of the coating composition for lubrication film of the present invention has particularly excellent wear resistance.

The coating composition for lubrication film of the present invention, in addition to the high energy beam-curable resin (A), further may include as a binder resin a non-high energy beam-curable resin. Although no particular limitation is placed on this type of non-high energy beam-curable resin, thermosetting resins, room temperature-curable resins, or the like may be cited as this non-high energy beam-curable resin. The thermosetting resin and room temperature-curable resin are exemplified by polyacrylic resins, polyurethane resins, polyolefin resins, epoxy resins, silicone resins, polyamide imide resins, and resins produced by modification of such resins. These non-high energy beam-curable resins may be used as a single type or may be used as a combination of two or more types. Among these non-high energy beam-curable resins, polyacrylic resins, polyurethane resins, and silicone resins are preferred from the standpoint of film forming ability and lubrication.

Although no particular limitation is placed on the content of the thermosetting resins and room temperature-curable resins in the coating composition for lubrication film of the present invention, from the standpoint of film forming ability, for example, this content relative to 100 parts by weight of the high energy beam-curable resin (A) is preferably within the range of 1 to 100 parts by weight, and further preferably is in the range of 50 to 100 parts by weight.

The silicone elastomer fine particles (B) are crosslinked products of linear diorganopolysiloxane composed of diorganosiloxy units (D units) and typically having average particle sizes of less than 50 μm, alternatively 0.1 to 50 μm as measured using a laser diffraction/scattering type particle size distribution (Beckman Coulter, Inc., model "LS 230"). The silicone elastomer fine particles (B) may be prepared by crosslinking reaction of diorganopolysiloxane by hydrosilylation reaction, silanol group condensation reaction, or the like. Among such preparation methods, the silicone elastomer fine particles (B) may be obtained with advantage by crosslinking reaction between diorganopolysiloxane having unsaturated hydrocarbon groups (e.g. alkenyl groups or the like) at the terminals or side chains and an organohydrogenpolysiloxane having silicon atom-bonded hydrogen atoms at the side chains or terminals in the presence of a hydrosilylation reaction catalyst. In comparison to silicone resin particles composed of monoorganosiloxy units (T units) and siloxy units (Q units), by combined use of the below described (C) component with the silicone elastomer fine particles (B), it is possible to lower the difference between the dynamic coefficient of friction and static coefficient of friction of the lubrication film formed from the coating composition for lubrication film of the present invention, and it is possible to impart to this lubrication film good feel when touched by the fingers.

Although no particular limitation is placed on the average particle size of the silicone elastomer fine particles (B), from the standpoint of storage stability and smoothness of the film surface, an average particle size as a median diameter determined by a laser diffraction/scattering type particle size distribution is preferably in the range of 0.1 μm to 50 μm, and further preferably is in the range of 1 μm to 20 μm. Moreover, the silicone elastomer fine particles (B) may assume various types of morphologies, such as spherical, flattened, irregularly shaped, or the like. From the standpoint of dispersibility, the shape of the silicone elastomer fine particles (B) is preferably spherical, and among such shapes, true-spherical is further preferred.

The silicone elastomer fine particles (B) may be in the form of an oil dispersion or an aqueous dispersion. Commercially marketed products as these silicone elastomer fine particles (B) are exemplified by the "Trefil E series" and "EP powder series" manufactured by Dow Corning Toray Co., Ltd., the "KMP series" manufactured by Shin-Etsu Chemical Co., Ltd., or the like.

The silicone elastomer fine particles (B) may be surface treated. Surface treatment agents are exemplified by methylhydrogenpolysiloxane, silicone resins, metal soaps, silane coupling agents, inorganic oxides (such as silica, titanium oxide, or the like), and fluorine compounds (such as perfluoroalkylsilane, perfluoroalkylphosphate salts, or the like.

Although no particular limitation is placed on the content of the silicone elastomer fine particles (B) in the coating composition for lubrication film of the present invention, from the standpoint of lubrication characteristics and smoothness of the film surface, the content of the silicone elastomer fine particle (B) in 100 parts by weight of the high energy beam-curable resin (A) composition is preferably in the range of 1 to 150 parts by weight.

The gum-like polysiloxane (C) is a highly polymerized linear diorganopolysiloxane or a highly polymerized linear diorganopolysiloxane that has a partial branched chain structure and in each instance a viscosity of greater than 1 000 000 mPa·s at 25° C. All viscosity measurements herein are based on measurements using a Brookfield® viscometer with a DV-2 THB RV/MA/HB-3 spindle at 25° C. unless otherwise indicated. Such gum-like polysiloxanes are also termed "silicone raw rubber" or "organopolysiloxane rubber". Since the gum-like polysiloxane (C) has a high degree of polymerization, the gum-like polysiloxane (C) has a sufficient plasticity number, i.e.>0 (ASTM D926-08) so that measurement of the plasticity number is possible. It is thus possible to distinguish the gum-like polysiloxane (C) from a general oily silicone. By addition of the gum-like polysiloxane (C) to the coating composition for lubrication film of the present invention and by combined use with the component (B), it is possible to decrease the difference between the dynamic coefficient of friction and the static coefficient of friction of the formed lubrication film, and it is further possible to form a lubrication film that has good feel without a feel of friction when touched by the fingers.

The gum-like polysiloxane (C) is exemplified by substituted or unsubstituted organopolysiloxanes having diorganosiloxy units (D units), such as dimethylpolysiloxane, methylphenylpolysiloxane, aminopolysiloxane, methylfluoroalkylpolysiloxanes, or the like, or substances having slightly crosslinked structures thereof. A representative example has the following general formula:

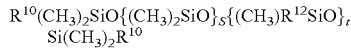

(In the formula, $R^{12}$ is a group selected from the vinyl group, phenyl group, alkyl groups having from 6 to 20 carbons, aminoalkyl groups having from 3 to 15 carbons, perfluoroalkyl groups having from 3 to 15 carbons, and quaternary ammonium salt group-containing alkyl groups having from 3 to 15 carbons; and the terminal group $R^{10}$ is a group selected from alkyl groups having from 1 to 8 carbons, the phenyl group, vinyl group, aminoalkyl groups having from 3 to 15 carbons, hydroxyl group, and alkoxy groups having from 1 to 8 carbons. Additionally, s is from 2,000 to 20,000, t is from 0 to 1,000, and s+t is from 2,000 to 20,000). In the present invention, as may be required, the gum-like polysiloxane (C) may be used as a single type, or may be used as a combination of two or more types.

From the standpoint of lubrication characteristics, a weight average molecular weight (Mw) of the gum-like polysiloxane (C) as measured by gel permeation chromatography (GPC), in terms of weight average molecular weight of standard polystyrene, is preferably in the range of 100,000 to 1,500,000, and further preferably is in the range of 500,000 to 1,000,000.

Although no particular limitation is placed on the content of the gum-like polysiloxane (C) in the coating composition for lubrication film of the present invention, from the standpoints of lubrication characteristics and dispersion stability, content relative to 100 parts by weight of the high energy beam-curable resin (A) composition is preferably in the range of 1 to 40 parts by weight, and further preferably is in the range of 10 to 20 parts by weight.

The coating composition for lubrication film of the present invention preferably further includes a (D) radical type photoinitiator, and the high energy beam-curable resin (A) preferably is a radical-polymerizable high energy beam-curable resin. The radical type photoinitiator (D) is exemplified by aryl ketone type photoinitiators (acetophenones, benzophenones, alkylaminophenones, hydroxyalkyl phenones, alkylaminobenzophenones, benzils, benzoins, benzoin ethers, benzyldimethylketals, benzoyl benzoates, α-acyloxime esters, or the like), sulfur-containing photoinitiators (such as sulfides, thioxanthones, or the like), and acylphosphine oxides (such as acyldiarylphosphine oxides or the like). The radical type photoinitiator (D) may be used as one type or in combination as two or more types. Moreover, the radical type photoinitiator (D) is preferably used in combination with an amine type or the like photosensitizers.

Specific examples of the radical type photoinitiator (D) include: 4-phenoxydichloroacetophenone, 4-tert-butyl-dichloroacetophenone, 4-tert-butyl-trichloroacetophenone, diethoxyacetophenone, 2-hydroxy-2-methyl-1-phenylpropan-1-one, 1-(4-isopropylphenyl)-2-hydroxy-2-methylpropan-1-one, 1-(4-dodecylphenyl)-2-methylpropan-1-one, 1-{4-(2-hydroxyethoxy)phenyl}-2-hydroxy-2-methyl-propan-1-one, 1-hydroxycyclohexylphenylketone, 2-methyl-1-{4-(methylthio)phenyl}-2-morpholinopropan-1-one; benzil, benzoin, benzoin methyl ether, benzoin ethyl ether, benzoin isopropyl ether, benzoin isobutyl ether, benzyl dimethyl ketal, benzophenone, benzoyl benzoate, methyl benzoyl benzoate, 4-phenylbenzophenone, hydroxybenzophenone, acrylated benzophenone, 3,3'-dimethyl-4-methoxy benzophenone, 3,3',4,4'-tetrakis(tert-butylperoxycarbonyl)benzophenone, 9,10-phenanthrenequinone, camphorquinone, dibenzosuberone, 2-ethylanthoraquinone, 4',4"-diethyl isophthalophenone, 1-phenyl-1,2-propanedione-2-(o-ethoxycarbonyl)oxime, α-acyloxime ester, methylphenylglyoxylate; 4-benzoyl-4'-methyldiphenylsulfide, thioxanthone, 2-chlorothioxanthone, 2-methylthioxanthone, 2,4-dimethylthioxanthone, isopropyl thioxanthone, 2,4-dichlorothioxanthone, 2,4-diethylthioxanthone, 2,4-diisopropylthioxanthone, 2,4,6-trimethylbenzoyldiphenylphosphine oxide, benzoyldiphenyl phosphine oxide, 2,6-dimethylbenzoyldiphenylphosphine oxide, bis(2,6-dimethoxybenzoyl)-2,4,4-trimethylpentylphosphine oxide, or the like, without particular limitation.

The content of the radical type photoinitiator (D) in the coating composition for lubrication film of the present invention, relative to 100 parts by weight of the high energy beam-curable resin (A), is preferably in the range of 0.1 to 10 parts by weight, and further preferably is in the range of 0.2 to 5 parts by weight. The amount of the radical type photoinitiator (D) is preferably in this range for sufficient curability and for decomposition of all the radical type photoinitiator (D) during curing.

The coating composition for lubrication film of the present invention may further include at least one type of (E) solid lubricant. In order to further lower the coefficient of friction of the film formed from the coating composition for lubrication film of the present invention, the solid lubricant (E) is preferably a solid at room temperature. This type of solid lubricant (E) is exemplified by inorganic microparticles and organic microparticles. A single type of these inorganic microparticles or organic microparticles, respectively, can be used, or combinations of two or more types may be used. Moreover, the inorganic microparticles and the organic microparticles may be used together.

Examples of inorganic microparticles of the solid lubricant (E) include microparticles of sulfides, graphite, boron nitride, metal oxide compounds, or the like. More specific examples include molybdenum disulfide, tungsten disulfide, graphite, hexagonal boron nitride, aluminum oxide, zinc oxide, and similar microparticles.

Examples of organic microparticles of the solid lubricant (E) include microparticles of fluoro resins, polyolefins, silicone resins, polyamides, or the like. More specific examples include microparticles of polytetrafluoroethylene, tetrafluoroethylene-perfluoroalkyl vinyl ether copolymer, tetrafluoroethylene-hexafluoropropylene copolymer, tetrafluoroethylene-ethylene copolymer, polyvinylidene fluoride, polychlorotrifluoroethylene, polyethylene, the "Trefil" series manufactured by Dow Corning Toray Co., Ltd, polyamides, or the like.

A particle diameter of the solid lubricant as determined by the laser diffraction/scattering type particle size distribution and expressed as the median diameter, from the standpoints of dispersibility and storage stability, is preferably in the range of 0.1 μm to 50 μm, further preferably is in the range of 0.1 μm to 30 μm, and most preferably is in the range of 0.1 μm to 20 μm.

Although no particular limitation is placed on the content of the solid lubricant (E) in the coating composition for lubrication film of the present invention, relative to 100 parts by weight of the high energy beam-curable resin (A), the content of the solid lubricant (E) is preferably in the range of 1 to 100 parts by weight, and further preferably is in the range of 10 to 50 parts by weight. When the content of the solid lubricant (E) is in this range, it is possible to obtain a coefficient of friction lowering effect for the lubrication film, and it is possible to maintain strength of the lubrication film.

From standpoints such as processability suitable for a substrate, the coating composition for lubrication film of the present invention may be used by dilution in (F) a solvent. Preferable examples of the solvent (F) include water or, alternately, organic solvents such as ethyl alcohol, butyl alcohol, isopropyl alcohol, and similar lower alcohols; methyl isobutyl ketone, methyl ethyl ketone, acetone, and similar ketones; dioxane, diethyleneglycol dimethylether, tetrahydrofuran, methyl-t-butyl ether, and similar ethers; methyl cellosolve, ethyl cellosolve, butyl cellosolve, propylene glycol monomethyl ether acetate, and similar cellosolves; and the like. In addition, methyl acetate, ethyl acetate, butyl acetate, pentyl acetate, ethyl lactate, diethyl succinate, diethyl adipate, dibutyl phthalate, dioctyl phthalate, and similar esters such as dibasic acid esters and the like; chlorinated and fluorinated hydrocarbons, trichloroethane, and similar halogenated hydrocarbons such as chlorinated hydrocarbons, fluorinated hydrocarbons, and the like; toluene, xylene, hexane, and similar hydrocarbons; and the like can be used. Although a solvent is preferably selected that is suitable according to the type of the substrate on which the film is formed, the solvent is preferably water or a lower alcohol from the standpoints of the processing environment in the step of application of the coating composition for lubrication film to the surface of the substrate.

Although no particular limitation is placed on the blended amount of the solvent (F) in the coating composition for lubrication film of the present invention, the blended amount of the solvent (F) relative to 100 parts by weight of the high energy beam-curable resin (A) is preferably in the range of 1 to 800 parts by weight, alternatively 150 to 750 parts by weight.

As may be required, the coating composition for lubrication film of the present invention may include one type or two or more types of additives selected from the group consisting of UV absorbers, photostabilizers, antioxidants, thermal polymerization inhibitors, leveling agents, anti-foaming agents, thickening agents, anti-settling additives, pigment (organic colored pigments and inorganic pigments), colored dyes, infrared radiation absorbers, fluorescent brighteners, dispersing agents, conductive microparticles, antistatic agents, antifogging agents, coupling agents, and the like.

Examples of the UV absorber include those commonly used as UV absorbers for synthetic resins such as benzotriazole-based UV absorbers, benzophenone-based UV absorbers, salicylic acid-based UV absorbers, phenyltriazine-based UV absorbers, and the like.

Specific examples thereof include the compound described in paragraph 0078 of Japanese Unexamined Patent Application Publication No. H11-268196. Because the coating composition for lubrication film of the present invention includes the high energy beam-curable resin (A), the UV absorber preferably includes a photopolymerization functional group within the molecule, as exemplified by 2-{2-hydroxy-5-(2-acryloyloxyethyl)phenyl}benzotriazole, 2-hydroxy-3-methacryloyloxypropyl-3-(3-benzotriazole-4-hydroxy-5-tert-butylphenyl) propionate, or the like.

The photostabilizer is preferably a hindered amine-based photostabilizer that is commonly used as a photostabilizer for synthetic resins. Specific examples thereof include the compounds described in paragraph 0080 of Japanese Unexamined Patent Application Publication No. H11-268196. In the present invention, a photostabilizer having a polymerizable functional group in the molecule such as N-methyl-4-methacryloyloxy-2,2,6,6-tetramethylpiperidine, and the like is particularly preferable:

The antioxidant is preferably a hindered phenol-base antioxidant such as 2,6-di-tert-butyl-p-cresol, and the like; a phosphorous-based antioxidant such as triphenyl phosphite and the like; or the like. Examples of the thermal polymerization inhibitor include hydroquinone monomethyl ether and the like. Examples of the leveling agent include silicone resin-based leveling agents, acrylic resin-based leveling agents, and the like.

Examples of the anti-foaming agent include silicone resin-based anti-foaming agents such as polydimethyl siloxane, and the like. Examples of the thickening agent include polymethyl methacrylate-based polymers, hydrogenated castor oil-based compounds, fatty acid amide-based compounds, and the like.

Examples of the organic coloration pigment include condensed polycyclic organic pigments, phthalocyanine-based organic pigments, and the like. Examples of the inorganic pigment include titanium dioxide, cobalt oxide, molybdenum red, titanium black, and the like. Examples of the coloration dye include organic solvent soluble azo-based metal complex salt dyes, organic solvent soluble phthalocyanine-based dyes, and the like.

Examples of the infrared radiation absorber include polymethine-based, phthalocyanine-based, metal complex-based, aminium-based, diimmonium-based, anthoraquinone-based, dithiol metal complex-based, naphthoquinone-based, indophenol-based, azo-based, triarylmethane-based compounds, and the like.

Examples of the conductive microparticles include zinc, aluminum, nickel, and similar metal powders, iron phosphide, antimony-doped tin oxide, and the like.

Examples of the antistatic agent include nonionic antistatic agents, cationic antistatic agents, anionic antistatic agents, and the like.

Examples of the coupling agent include silane coupling agents, titanate coupling agents, and the like.

Hence the composition may comprise a high energy beam-curable resin (A) as described in any combination hereabove;

from 1 to 150 parts by weight per 100 parts by weight of the high energy beam-curable resin (A) of silicone elastomer fine particles (B) preferably having an average particle diameter of from 0.1 µm to 50 µm;

1 to 40 parts by weight per 100 parts by weight of the high energy beam-curable resin (A) of a gum-like polysiloxane (C) preferably having a weight average molecular weight of from 100,000 to 1,500,000; and optionally radical type photoinitiator (D), solid lubricant (E) or a combination of thereof.

Alternatively the composition may comprise a high energy beam-curable resin (A) as described in any combination hereabove;

from 10 to 120 parts by weight per 100 parts by weight of the high energy beam-curable resin (A) of silicone elastomer fine particles (B) preferably having an average particle diameter of from 0.1 µm to 50 µm;

10 to 20 parts by weight per 100 parts by weight of the high energy beam-curable resin (A) of a gum-like polysiloxane (C) preferably having a weight average molecular weight of from 100,000 to 1,500,000; and optionally 0.1 to 5 parts by weight per 100 parts by weight of the high energy beam-curable resin (A) radical type photoinitiator (D), 1 to 150 parts by weight per 100 parts by weight of the high energy beam-curable resin (A) solid lubricant (E) or a combination of thereof.

In a still further alternative the composition may comprise a high energy beam-curable resin (A) as described in any combination hereabove;

from 10 to 120 parts by weight per 100 parts by weight of the high energy beam-curable resin (A) of silicone elastomer fine particles (B) preferably having an average particle diameter of from 0.1 µm to 50 µm;

10 to 20 parts by weight per 100 parts by weight of the high energy beam-curable resin (A) of a gum-like polysiloxane (C) preferably having a weight average molecular weight of from 100,000 to 1,500,000; and optionally 0.2 to 5 parts by weight per 100 parts by weight of the high energy beam-curable resin (A) of a radical type photoinitiator (D), 10 to 50 parts by weight per 100 parts by weight of the high energy beam-curable resin (A) of a solid lubricant (E) or a combination of thereof and 1 to 800 parts by weight, alternatively 150 to 750 parts by weight per 100 parts by weight of the high energy beam-curable resin (A) of a solvent (F) or any combination of said (D), (E) and (F).

The coating composition for lubrication film of the present invention may be prepared, for example, by blending the following components in the desired order: (A) the high energy beam-curable resin, (B) the silicone elastomer fine particles, and (C) the gum-like polysiloxane, and as may be required, the non-high energy beam-curable resin, (D) the radical type photoinitiator, (E) the solid lubricant, and (F) solvent, as well as other desired components such as the additives, or the like. Although no particular limitation is placed on the blending method of the silicone elastomer fine particles (B) and the gum-like polysiloxane (C), possible blending methods are exemplified by: blending the high energy beam-curable resin (A), and as may be required, non-high energy beam-curable resin, and the solvent (F), and thereafter mixing the silicone elastomer fine particles (B) and gum-like polysiloxane (C) in the desired order; making beforehand a water-dispersed emulsion of the gum-like polysiloxane (C), and then applying the emulsion to the coating composition for lubrication film; or blending beforehand this emulsion of the gum-like polysiloxane (C) and the silicone elastomer fine particles (B), and then blending into the coating composition for lubrication film. When the gum-like polysiloxane (C) is prepared beforehand as an emulsion dispersed in water, the particle diameter of this emulsion as a median diameter measured using the laser diffraction/scattering type particle size distribution is preferably in the range of 0.01 µm to 50 µm from the standpoints of dispersibility and storage stability.

<Lubrication Film>

The lubrication film of the present invention is characterized in that the lubrication film is cured by irradiating the coating composition for lubrication film with high energy beams. The difference between the static coefficient of friction and dynamic coefficient of friction is small (i.e. <0.10) for this type of lubrication film, and it is thus possible to suppress the occurrence of the stick-slip phenomenon. Moreover, it is possible to impart to the substrate good moist feel lacking a feel of friction when touched by the fingers, and it is possible to have good adhesion to the substrate and to have good followability to conform to deformation of the substrate.

The high energy beam may be one type or two or more types. The high energy beam source is exemplified by ultraviolet light irradiation devices such as xenon lamps, low-pressure mercury lamps, high-pressure mercury lamps, ultra high-pressure mercury lamps, metal halide lamps, carbon arc lamps, tungsten lamps, or the like; electron irradiation devices; X-ray radiation devices; high frequency generation devices; or the like.

The irradiation time of the high energy beam may be varied appropriately according to the type of each component in the coating composition for lubrication film of the present invention, thickness of the film, conditions of the high energy beam source, or the like. An irradiation time of 1 second to 1 hour is normally sufficient. Furthermore, for the purpose of completing the curing reaction, it is permissible to perform heat treatment after the high energy beam irradiation. For example, the heating can be performed in a temperature range of 20 to 300° C., but is preferably performed in a temperature range of 20 to 250° C., and more preferably in a temperature range of 20 to 200° C. Moreover, if the coating composition for lubrication film of the present invention includes the solvent (F), curing by irradiation of the high energy beam is preferably performed after drying.

<Method of Forming the Lubrication Film>

The method of forming the lubrication film of the present invention is characterized as including the steps of: applying the coating composition for lubrication film to the surface of a substrate, and curing the coating composition for lubrication film by irradiating this coating composition for lubrication film applied to the surface of the substrate with high energy beams. With this method of forming the lubrication film, it is possible to form a lubrication film that has a small (i.e. <0.10) difference between the static coefficient of friction and dynamic coefficient of friction, and thus it is possible to suppress the occurrence of the stick-slip phenomenon. Moreover, it is possible to form on the substrate a lubrication film that displays good moist feel and lacks a feel of friction when touched by the fingers, that displays good adhesion to the substrate, and that displays good followability to conform to deformation of the substrate.

Any widely known technical means may be used for application of the coating composition for lubrication film to the surface of the substrate, as exemplified by dip coating, spin coating, flow coating, spray coating, bar coating, gravure coating, roll coating, blade coating, air knife coating, die coating, or the like. Although no particular limitation is placed on thickness of the lubrication film formed on the surface of the substrate, this thickness is preferably from 1 to 50 μm, and further preferably is from 5 to 30 μm.

The method for high energy beam irradiation of the coating composition for lubrication film applied to the surface of the substrate and curing the coating composition for lubrication film may be the same methods as described in detail in the above section "Lubrication Film". In the present invention, it is possible to produce the surface-coated substrate by irradiation of the surface of the substrate using the high energy beam after application of the coating composition for lubrication film to the surface of the substrate. Thus there is no need for heating the substrate, and it is possible to form a lubrication film having the aforementioned excellent characteristics on the desired substrate.

The substrate may be a desired type such as an inorganic type or organic type substrate. Examples of inorganic substrates include substrates formed from soda lime glass, quartz glass, heat resistant glass, or a similar transparent or semi-transparent glass or indium tin oxide (ITO) or a similar metallic oxide; and substrates formed from silicon, aluminum, iron, or a similar metal. Examples of organic substrates include substrates formed from plastic or rubber. Examples of the substrates formed from plastic or rubber include substrates formed from polycarbonate, polymethyl methacrylate resin, polymethacrylic imide resin, polystyrene resin, polyvinyl chloride resin, unsaturated polyester resin, polyolefin resin, ABS resin, MS (methyl methacrylate-styrene) resin, and the like.

EXAMPLES

Although the present invention is explained more specifically based on practical examples, as long as the gist of the invention is not exceeded, the present invention is not limited to the practical examples described below.

Practical Examples 1 to 7 and Comparative Examples 1 to 4

The high energy beam-curable resin, the non-high energy beam-curable resin, and the solvent listed in Tables 1 to 3 were stirred and mixed at the compounding ratios listed in Tables 1 to 3. Thereafter, the radical type photoinitiator was added and dissolved. Thereafter, the gum-like polysiloxane was blended, and then the silicone elastomer fine particles, and as may be required, the solid lubricant were added while the mixture was stirred. The obtained mixture was stirred and mixed for 30 minutes at 1,000 rpm to obtain the coating compositions for lubrication films of Practical Examples 1 to 7 and Comparative Examples 1 to 4.

Thereafter, the obtained coating composition for lubrication film was applied by a spray coater to obtain a 5 to 10 μm thick lubrication film (post-curing thickness) using each of the types of substrates indicated in Tables 1 to 3. After keeping the sample at 25° C. for 5 minutes for volatilization of the solvent in the applied coating composition for lubrication film, the sample was irradiated for an accumulated dose of 2,000 mJ/cm$^2$ to 3,000 mJ/cm$^2$ using a 250 W handy type UV irradiator (manufactured by Asumi Giken, Limited) to cure the coating composition for lubrication film applied to each type of substrate and to produce the lubrication films of Practical Examples 1 to 7 and Comparative Examples 1 to 4.

The specific raw materials indicated in Tables 1 to 3 are explained below. Among these raw materials, the viscosity of the urethane acrylate is the value measured at 25° C. using a B type viscometer according to JIS K 7117-1.

<UV Curable Urethane Acrylate A>

Film forming aqueous polycarbonate-based polyurethane resin emulsion: Reaction product of polycarbonate diol, polyisocyanate, and a compound comprising hydroxyl groups and acryloyl groups (solid content: 30%, viscosity: 20 mPas)

<UV Curable Urethane Acrylate B>

Film forming aqueous polyester-based polyurethane resin emulsion: Reaction product of polyester polyol, polyisocyanate, and a compound comprising hydroxyl groups and (meth)acryloyl groups (solid content: 30%, viscosity: 20 mPas)

<Silicone Resin>

Film forming aqueous polysiloxane resin emulsion (manufactured by Dow Corning Toray Co., Ltd., product name "FZ-4658", solid content=21% by weight)

<Silicone Resin Powder>

Product name="Trefil R-902A", manufactured by Dow Corning Toray Co., Ltd., median diameter of 3 μm as measured using a laser diffraction/scattering type particle size distribution (Beckman Coulter, Inc., model "LS 230"), irregularly shaped silicone resin powder having no softening point and composed of units represented by $(CH_3)SiO_{3/2}$. Silicon-bonded hydroxyl groups content: 5%. Specific gravity: 1.33.

<Radical Type Photoinitiator>

α-aminoalkyl phenone type photoinitiator (manufactured by BASF Japan Co., Ltd., product name="IRGACURE 907", solid content=100% by weight)

<Silicone Elastomer Fine Particles A>

Spherical polydimethylsiloxane elastomer fine particle powder having a median diameter measured using a laser diffraction/scattering type particle size distribution (Beckman Coulter, Inc., model "LS 230")=2 μm to 7 μm.

<Silicone Elastomer Fine Particles B>

Spherical polydimethylsiloxane elastomer fine particle powder dispersion solution having a median diameter measured using a laser diffraction/scattering type particle size distribution (Beckman Coulter, Inc., model "LS 230")=3 μm.

<Gum-Like Polysiloxane A>

Oil-in-water type emulsion of 500,000 to 1,000,000 weight average molecular weight polydimethylsiloxane. Solid content=65% by weight.

<Gum-Like Polysiloxane B>

Oil-in-water type emulsion of 500,000 to 600,000 weight average molecular weight polydimethylsiloxane. Solid content=55% by weight.

<Polysiloxane C>

Polyether-modified polydimethylsiloxane having a weight average molecular weight of about 3,000

<Polytetrafluoroethylene>

Polytetrafluoroethylene resin powder having a median diameter of 2 μm to 4 μm measured using a laser diffraction/scattering type particle size distribution (Beckman Coulter, Inc., model "LS 230")

The various specific types of substrates are listed below.

<ABS>

ABS resin plate, manufactured by Sumitomo Bakelite Co., Ltd., product name="Toughace R"

<PC>

PC resin plate, manufactured by Mitsubishi Engineering-Plastics Corporation, product name="lupilon S-3000"

<EPDM>

EPDM rubber board, manufactured by Irumagawa Rubber Co., Ltd., crosslinked product of ethylene propylene diene monomer <Steel Plate (SPCC-SB)>

SPCC steel plate, manufactured by Nisshin Steel Co., Ltd., product name="SPCC-SB"

<Aluminum Plate>

Manufactured by Furukawa-Sky Aluminum Corp., product name="A-1050P"

<Evaluation>

The obtained lubrication films of Practical Examples 1 to 7 and Comparative Examples 1 to 4 were subjected to (a) dynamic coefficient of friction and static coefficient of friction measurement, (b) evaluation of feel when touched by the fingers, (c) evaluation of followability, and (d) cross-cut adhesion testing.

<Measurement of Dynamic Coefficient of Friction and Static Coefficient of Friction>

Measurement of the dynamic coefficient of friction and static coefficient of friction was performed in the following manner. A 2 kg vertical load was applied to the lubrication film surface formed on a substrate made of ABS to contact a cylindrically shaped SUJ2 steel roller (outside diameter: 8 mm, width: 10 mm) fixed to a jig so as not to rotate. Next, the substrate was moved in a horizontal reciprocating manner (average velocity: 6.6 mm/second, slide distance (stroke): 20 mm), the roller was made to slide with the lubrication film, and frictional force was detected by a load cell attached to the jig. For calculation of the dynamic coefficient of friction and static coefficient of friction, a 2 kg vertical load was applied on the lubrication film surface to cause contact with the roller, and after the assembly was allowed to sit for 10 minutes at 25° C., sliding was started. The static coefficient of friction was calculated from the maximum frictional force immediately after the start of sliding, and the dynamic coefficient of friction was calculated from the frictional force after 1 second of sliding.

<Evaluation of Feel when Touched by Fingers>

Feel when touched by the fingers was evaluated relative to EPDM rubber board (1 mm thick, crosslinked product of ethylene propylene diene monomer, manufactured by Irumagawa Rubber Co., Ltd.) onto which a lubrication film had been formed, and the results were indicated based on the below listed criteria.

⊚ (double circle): There was a moist feel without creaking when the fingers were moved.
o: There was no creaking when the fingers were moved.
Δ (delta): There was creaking when the fingers were moved, and a certain degree of sound could be heard.
x: There was clear creaking when the fingers were moved, and a sound was heard.

<Followability Evaluation>

In the evaluation of followability, the EPDM rubber board (thickness=1 mm, crosslinked product of ethylene propylene diene monomer, manufactured by Irumagawa Rubber Co., Ltd.) on which the lubrication film (5 μm thick) was formed were stretched to an elongation of 250% at a rate of pulling of 50 mm/minute, by an AGS Series Shimadzu Autograph (manufactured by Shimadzu Corporation) and, thereafter, were allowed to stand at 25° C. for one day. Thereafter, the board was released from the tensed state and the presence or absence of peeling of the lubrication film surface was confirmed using a microscope. The followability was evaluated according to the following standards.

⊚ (double circle): There was neither cracking nor pealing.
o: Very minor cracking but no peeling observed
Δ (delta): Cracking and very minor peeling observed
x: Cracking and peeling observed <Cross-Cut Adhesion Testing>

Cross-cut adhesion testing was performed using each of the test samples formed of the lubrication film based on JIS-K 5400 8.5.1. Specifically, a grid of 100 elements was formed by cross cutting (spaced 2 mm apart) into the test sample, and cellophane adhesive tape (manufactured by Nichiban Co., Ltd., No. 405) was pressed against the grid-shaped cut surface. After complete attachment, the tape was peeled off by pulling straight up. The lubrication film surface was observed visually after peeling, and the number of lattice elements remaining in the lubrication film from among the grid of 100 elements was checked. When all of the lubrication film remained (100 elements), the evaluation was "⊚ (double circle)". When 90 to 99 elements remained, the evaluation was "o". When 50 to 89 elements remained, the evaluation was "Δ (delta)". When 0 to 49 elements remained, the evaluation was "x".

The compositions of the coating compositions for lubrication films and evaluation results of lubrication films of Practical Examples 1 to 7 and Comparative Examples 1 to 4 are shown below in Tables 1 to 3. In the tables, the various terms have the meanings listed below. Moreover, the values in the tables are based on parts by weight (parts by mass). Moreover, each of the raw materials other than the solvents is indicated by parts by weight of solid content. For the solvent, parts by weight is indicated.

TABLE 1

| | | Example 1 | Example 2 | Example 3 | Example 4 |
|---|---|---|---|---|---|
| High energy beam curable resin | Ultraviolet curable urethane acrylate A | 100 | 100 | 100 | 100 |
| | Ultraviolet curable urethane acrylate B | 0 | 0 | 0 | 0 |
| Non-high energy beam curable resin | Silicone resin | 0 | 0 | 0 | 0 |
| Photopolymerization initiator | Radical photopolymerization initiator | 1.5 | 1.5 | 1.5 | 1.5 |
| Silicone elastomer microparticles | Silicone elastomer microparticles A | 30 | 30 | 70 | 0 |
| | Silicone elastomer microparticles B | 0 | 0 | 0 | 50 |
| Solid lubricant | Polytetrafluoroethylene | 0 | 0 | 0 | 0 |
| Gum-like | Gum-like polysiloxane A | 10 | 0 | 20 | 20 |

TABLE 1-continued

|  |  | Example 1 | Example 2 | Example 3 | Example 4 |
|---|---|---|---|---|---|
| polysiloxane | Gum-like polysiloxane B | 0 | 10 | 0 | 0 |
| Solvent | Ion-exchange water | 270 | 270 | 420 | 400 |
| Lubrication Coating Properties | Dynamic friction coefficient | 0.028 | 0.031 | 0.022 | 0.021 |
|  | Static friction coefficient | 0.033 | 0.038 | 0.028 | 0.027 |
|  | (static friction coefficient) − (dynamic friction coefficient) | 0.005 | 0.008 | 0.006 | 0.006 |
|  | Texture when touched by finger | ◎ | ◎ | ◎ | ◎ |
|  | Tracking performance | ◎ | ◎ | ◎ | ◎ |
|  | Cross-cut adhesion — Base material: ABS | ◎ | ◎ | ◎ | ◎ |
|  | Base material: PC | ◎ | ◎ | ◎ | ◎ |
|  | Base material: EPDM | ◎ | ◎ | ◎ | ◎ |
|  | Base material: steel sheet (SPCC-SB) | ◎ | ◎ | ◎ | ◎ |
|  | Base material: aluminum sheet (A-1050P) | ◎ | ◎ | ◎ | ◎ |

TABLE 2

|  |  | Example 5 | Example 6 | Example 7 |
|---|---|---|---|---|
| High energy beam curable resin | Ultraviolet curable urethane acrylate A | 100 | 100 | 0 |
|  | Ultraviolet curable urethane acrylate B | 0 | 0 | 100 |
| Non-high energy beam curable resin | Silicone resin | 70 | 0 | 0 |
| Photopolymerization initiator | Radical photopolymerization initiator | 1.5 | 1.5 | 1.5 |
| Silicone elastomer microparticles | Silicone elastomer microparticles A | 120 | 15 | 30 |
|  | Silicone elastomer microparticles B | 0 | 0 | 0 |
| Solid lubricant | Polytetrafluoroethylene | 0 | 15 | 0 |
| Gum-like polysiloxane | Gum-like polysiloxane A | 20 | 10 | 10 |
|  | Gum-like polysiloxane B | 0 | 0 | 0 |
| Solvent | Ion-exchange water | 700 | 320 | 320 |
| Lubrication Coating Properties | Dynamic friction coefficient | 0.017 | 0.026 | 0.031 |
|  | Static friction coefficient | 0.020 | 0.036 | 0.036 |
|  | (static friction coefficient) − (dynamic friction coefficient) | 0.003 | 0.010 | 0.005 |
|  | Texture when touched by finger | ◎ | ◎ | ◎ |
|  | Tracking performance | ◎ | ◎ | ◎ |
|  | Cross-cut adhesion — Base material: ABS | ◎ | ◎ | ◎ |
|  | Base material: PC | ◎ | ◎ | ◎ |
|  | Base material: EPDM | ◎ | ◎ | ◎ |
|  | Base material: steel sheet (SPCC-SB) | ◎ | ◎ | ◎ |
|  | Base material: aluminum sheet (A-1050P) | ◎ | ◎ | ◎ |

TABLE 3

| | Comparative Example No. | 1 | 2 | 3 | 4 |
|---|---|---|---|---|---|
| High energy beam curable resin | Ultraviolet curable urethane acrylate A | 100 | 100 | 100 | 100 |
| Photopolymerization initiator | Radical photopolymerization initiator | 1.5 | 1.5 | 1.5 | 1.5 |
| Silicone elastomer microparticles | Silicone elastomer microparticles A | 0 | 30 | 0 | 0 |
| | Silicone elastomer microparticles B | 0 | 0 | 0 | 0 |
| Silicon resin powder | | 0 | 0 | 30 | 0 |
| Solid lubricant | Polytetrafluoroethylene | 0 | 0 | 0 | 0 |
| Gum-like polysiloxane | Gum-like polysiloxane A | 0 | 0 | 10 | 10 |
| Polysiloxane | Polysiloxane C | 0 | 10 | 0 | 0 |
| Solvent | Ion-exchanged water | 220 | 250 | 280 | 260 |
| Lubrication Coating Properties | Dynamic friction coefficient | 0.348 | 0.051 | 0.066 | 0.082 |
| | Static friction coefficient | 0.511 | 0.077 | 0.112 | 0.087 |
| | (static friction coefficient) − (dynamic friction coefficient) | 0.164 | 0.026 | 0.046 | 0.005 |
| | Texture when touched by finger | X | Δ | X | Δ |
| | Tracking performance | ○ | ◎ | ◎ | ○ |
| | Cross-cut adhesion | Base material: ABS | ◎ | ◎ | ◎ | ◎ |
| | | Base material: PC | ◎ | ◎ | ◎ | ◎ |
| | | Base material: EPDM | ◎ | ◎ | ◎ | ◎ |
| | | Base material: steel sheet (SPCC-SB) | ◎ | ◎ | ◎ | ◎ |
| | | Base material: aluminum sheet (A-1050P) | ◎ | ◎ | ◎ | ◎ |

According to Tables 1 to 3, the difference between the static coefficient of friction and the dynamic coefficient of friction was small (i.e. <0.10) for the lubrication films of Practical Examples 1 to 7. It was thus possible to suppress the occurrence of the stick-slip phenomenon. Moreover, there was good adhesion and followability to conform to the substrate, and the practical examples had good moist feel without a sense of creaking when touched by the fingers.

INDUSTRIAL APPLICABILITY

The coating composition for lubrication film and method of forming the lubrication film of the present invention suppress the occurrence of the stick-slip phenomenon, and may be used appropriately for applications requiring good feel for a lubrication film. The coating composition for lubrication film and the method of forming the lubrication film of the present invention may be used for surface treatment of crank shafts, slide bearings, pistons, gaskets, gears, door panels, instrument panels, door locks, timing belts, sunroof body seals, glass runs, weather strips, or the like, for example.

The invention claimed is:

1. A coating composition for lubrication film, said coating composition comprising:
   (A) a high energy beam-curable resin;
   (B) silicone elastomer fine particles;
   (C) a gum-like polysiloxane; and
   (D) a radical type photoinitiator;
   wherein the high energy beam-curable resin (A) is a radical-polymerizable high energy beam-curable resin.

2. The coating composition according to claim 1, wherein a weight average molecular weight of the gum-like polysiloxane (C) is from 100,000 to 1,500,000 as measured by gel permeation chromatography (GPC), in terms of weight average molecular weight of standard polystyrene.

3. The coating composition according to claim 1, comprising from 1 to 40 parts by weight of the gum-like polysiloxane (C) per 100 parts by weight of the high energy beam-curable resin (A).

4. The coating composition according to claim 1, wherein the high energy beam-curable resin (A) is a (meth)acryloyl group-containing compound having a urethane bond.

5. The coating composition according to claim 1, wherein an average particle diameter of the silicone elastomer fine particles (B) is from 0.1 μm to 50 μm.

6. The coating composition according to claim 1, comprising from 1 to 150 parts by weight of the silicone elastomer fine particles (B) per 100 parts by weight of the high energy beam-curable resin (A).

7. The coating composition according to claim 1, further comprising:
   (E) a solid lubricant.

8. A lubrication film cured by irradiating the coating composition according to claim 1 with high energy beams.

9. A method of forming a lubrication film, said method comprising the steps of:
   applying a coating composition to a surface of a substrate; and
   curing the coating composition by irradiating the coating composition applied to the surface of the substrate with high energy beams;
   wherein the coating composition is according to claim 1.

10. A substrate having a surface treatment disposed thereon, wherein the surface treatment is formed from the coating composition according to claim 1.

11. The substrate according to claim 10, further defined as a crank shaft, slide bearing, piston, gasket, gear, door panel, instrument panel, door lock, timing belt, sunroof body seal, glass run or weather strip.

12. A lubrication film formed from the coating composition according to claim 1.

13. The coating composition according to claim 1, further comprising:

(F) a solvent.

14. The coating composition according to claim 1, comprising from 0.1 to 10 parts by weight of the radical type photoinitiator (D) per 100 parts by weight of the high energy beam-curable resin (A).

15. The coating composition according to claim 7, comprising from 1 to 150, parts by weight of the solid lubricant (E) per 100 parts by weight of the high energy beam-curable resin (A).

16. The coating composition according to claim 13, comprising from 1 to 800 parts by weight of the solvent (F) per 100 parts by weight of the high energy beam-curable resin (A).

* * * * *